United States Patent [19]
Krützfeldt et al.

[11] Patent Number: 6,086,333
[45] Date of Patent: Jul. 11, 2000

[54] PROCESS AND DEVICE FOR QUICKLY REDUCING PRESSURE IN AN INSTALLATION, IN PARTICULAR A HYDROGEN-COOLED GENERATOR

[75] Inventors: Joachim Krützfeldt, Müheim; Rudolf Von Musil, Oberhausen, both of Germany

[73] Assignee: Siemens Aktiengesellschaft, Munich, Germany

[21] Appl. No.: 09/000,048

[22] PCT Filed: Jul. 15, 1996

[86] PCT No.: PCT/DE96/01284

§ 371 Date: Jan. 23, 1998

§ 102(e) Date: Jan. 23, 1998

[87] PCT Pub. No.: WO97/05686

PCT Pub. Date: Feb. 13, 1997

[30] Foreign Application Priority Data

Jul. 31, 1995 [DE] Germany .................. 195 28 090

[51] Int. Cl.[7] .................. F04F 5/48; F04B 23/08
[52] U.S. Cl. .................. 417/54; 417/87; 417/187; 417/190; 277/432
[58] Field of Search .................. 417/54, 76, 87, 417/182, 190, 307; 277/303, 304, 320, 432; 62/50.7

[56] References Cited

U.S. PATENT DOCUMENTS

| | | | |
|---|---|---|---|
| 1,728,268 | 9/1929 | Flanders | 277/432 |
| 2,159,057 | 6/1939 | Sterrett | 277/432 |
| 2,968,499 | 1/1961 | Grobel | 277/432 |
| 3,688,872 | 9/1972 | Wagner | 277/432 |

FOREIGN PATENT DOCUMENTS

| | | |
|---|---|---|
| 0 080 299 A1 | 6/1983 | European Pat. Off. . |
| 1 038 173 | 9/1958 | Germany . |
| 2101943 | 4/1990 | Japan . |
| 402106144 | 4/1990 | Japan .................. 310/52 |
| 760781 | 11/1956 | United Kingdom . |
| WO 94/10739 | 5/1994 | WIPO . |

OTHER PUBLICATIONS

Bothur, F., Erfahrungen mit wasserstoffegkühlten Turbogeneratoren (Experiences With Hydrogen–Cooled TurboGenerators), Dec. 5, 1961, pp. 877–881.

Suganami, T. et al., A Study on Thermal Behavior of Large Seal–Ring, *Journal of Lubrication Technology*, Oct. 1982, vol. 104, pp. 449–453.

*Primary Examiner*—Timothy S. Thorpe
*Assistant Examiner*—Cheryl J. Tyler
*Attorney, Agent, or Firm*—Herbert L. Lerner; Laurence A. Greenberg; Werner H. Stemer

[57] ABSTRACT

A method and device for quick pressure relief in a hydrogen-cooled generator system. The hydrogen-cooled generator system at least includes a first and second housing part and a hydrogen seal that separates the first housing part from the interior of the second housing part. In the normal state, the first housing part contains a hydrogen atmosphere at overpressure that is separated from the interior of the second housing part by the hydrogen seal. The quick pressure relief method includes the steps of lowering the pressure of the overpressure hydrogen in the first housing part through a quick discharge line upon failure of the hydrogen seal, and exhausting gas from the interior of the second housing part through a bleed line that is connected to the quick discharge line. The quick pressure relief device includes a quick discharge line for relieving pressure from the first housing part upon a failure of the hydrogen seal, and a bleed line fluidically connected to the quick discharge line and to the interior of the second housing part.

14 Claims, 1 Drawing Sheet

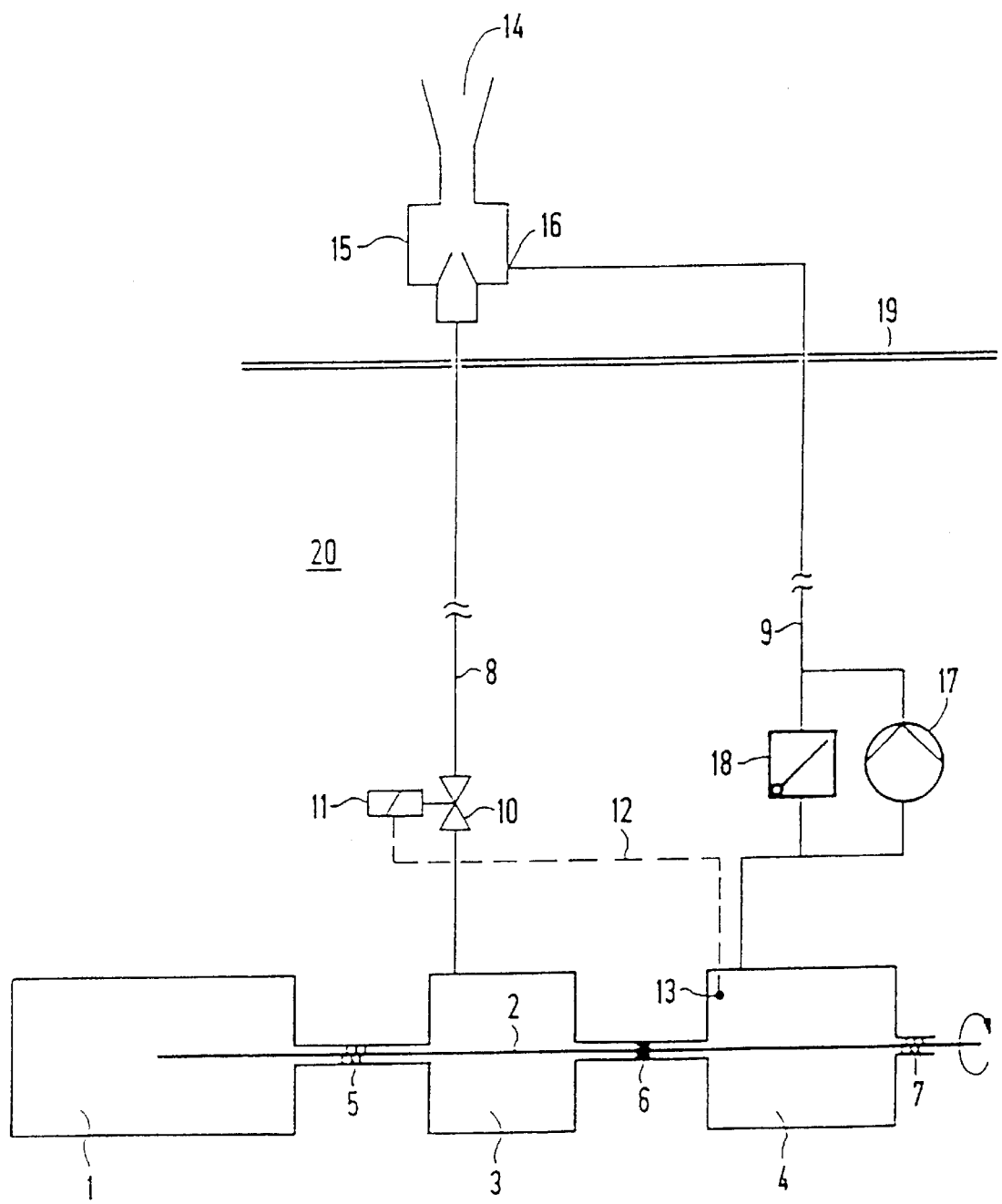

PROCESS AND DEVICE FOR QUICKLY REDUCING PRESSURE IN AN INSTALLATION, IN PARTICULAR A HYDROGEN-COOLED GENERATOR

TITLE OF THE INVENTION

Method and device for quick pressure relief in a system, in particular in a hydrogen-cooled generator.

BACKGROUND OF THE INVENTION

The present invention relates to a method and a device for quick pressure relief in a system having at least a first and a second housing part, it being the case that in the normal state the first housing part contains a hydrogen atmosphere at overpressure which is separated from the interior of the second housing part by a hydrogen seal, the overpressure of hydrogen being lowered via a quick discharge line upon failure of the hydrogen seal. The main field of application of the invention, to which it is not, however, limited, are hydrogen-cooled generators whose shafts are guided through various seals and housing parts, it being necessary to ensure the secure inclusion in the generator housing of the hydrogen at overpressure. In the case of leaks of hydrogen, the highly explosive oxyhydrogen gas can form in combination with air, which is to be prevented under all circumstances, even in the event of stoppages.

In a typical hydrogen-cooled generator according to the prior art, for example GB Patent 760,781 or the article entitled "A Study on Thermal Behavior of Large Seal-Ring" by T. Suganami, T. Masuda, N. Oishi and T. Shimazu in Journal of Lubrication Technology, October 1982, VOL 104/449, the generator shaft is guided through a labyrinth seal into a prechamber, then through a hydrogen seal into a so-called bearing compartment and from there to the outside into the machine hall or, for example to a turbine or a gear unit. It is likewise customary to effect the seal between the bearing compartment and machine hall by a labyrinth seal. Labyrinth seals are not completely gas-tight, but act only like a strong throttle valve, with the result that hydrogen can escape along these seals. In the normal state, the same pressure therefore prevails in the prechamber as in the generator housing. By contrast, essentially normal room air is located in the bearing compartment, which is closed with respect to the prechamber with a virtually complete sealing function by a hydrogen seal. Said air is held by means of a bleed pump at a slight underpressure so that any small quantities of hydrogen which do pass through the hydrogen seal cannot pass through the labyrinth seal of the bearing compartment into the machine hall, but are exhausted and released into the open.

In the case of failure of the hydrogen seal, it is known from WO 94/10739 A1 to open a quick discharge line through which the overpressure in the prechamber can be very quickly relieved. However, such a large volume is involved that it is possible, at least for a certain time, for hydrogen to flow through the defective hydrogen seal into the bearing compartment and to pass from there into the machine hall through the labyrinth seal. This cannot be prevented by the bleed pump, which conveys only a relatively low volume per time unit. It is true that hydrogen can be prevented from escaping into the power house omission by means of sealing air in the outer labyrinth seal, but this measure is relatively expensive.

A device for safeguarding generators cooled by means of hydrogen gas in the event of the occurrence of impermissible operating states is likewise specified in DE-B 1 038 173. The device has a quick-opening valve, provided directly on the generator housing, of large nominal diameter by means of which an exhaust line leading into the open is opened in the case of danger. The quick-opening valve is a solenoid valve or a valve actuated by a solenoid valve. The solenoid valve is tripped by the operation of a gas pressure switch which is installed in the shaft bearing compartments or in the housing of the generator. Tripping is performed in the case of an increased hydrogen concentration in the shaft bearing compartments.

The article entitled "Erfahrungen mit wasser-stoffgekühlten Turbogeneratoren" ["Experience with hydrogen-cooled Turbogenerators"] by Franz Bothur in "Elektrizitätswirtschaft", Issue 23, pages 877 to 881, December 1991 describes a hydrogen-cooled generator having an oil seal. The oil seal has an oil outlet chamber to which there is connected an exhaust line which leads into the free atmosphere, but which does not prevent a large quantity of oil from coming into contact with hydrogen and being enriched thereby. Consequently, for generators having higher hydrogen pressures, there is provided as an additional safety measure a pressure-relieving device which opens immediately before the lifting of the shaft seal and discharges most of the hydrogen into the open. The pressure-relieving device is an electromagnetically actuated valve with a large is opening cross-section.

SUMMARY OF THE INVENTION

It is the object of the present invention to use simple means for reliably avoiding an escape of hydrogen into the power house in the case of the system design described and of similar ones.

According to the invention, this object is achieved by means of a device in which a quick discharge line is connected via a bleed line to the interior of the second housing part, in particular in the quick discharge line of a jet pump. According to the invention, the object, which is directed to a method for quick discharge of a first housing part, is achieved by means of a method in which gas is exhausted via the bleed line from the interior of the second housing part by means of the flow of the hydrogen in the quick discharge line. Advantageous embodiments are described in the respective dependent claims.

The invention assumes that in the case of opening the quick discharge line the hydrogen at overpressure flows at high speed to an outlet, preferably above the roof of the power house. The basic idea of the present invention consists in utilizing the energy of the out-flowing hydrogen from the first housing part for the purpose of simultaneously exhausting the gas in the second housing part. This is performed without mechanically moving parts, preferably by means of a jet pump which is arranged in the quick discharge line and to whose suction line the bleed line of the second housing part is connected.

In the case of applying the invention to a generator system, it is typical to arrange in the bleed line of the second housing part, that is to say of the bearing compartment, a bleed pump which maintains a slight underpressure in the bearing compartment, as a result of which small quantities of hydrogen which pass through the hydrogen seal are exhausted and cannot reach the power house. This bleed pump is, however, not capable of exhausting larger quantities of hydrogen which penetrate the storage compartment in the case of failure of the hydrogen seal. In the case of the first housing part, that is to say the prechamber, being emptied quickly by the jet pump, the bleed pump in the bleed line would greatly hinder effective exhausting of the atmosphere from the interior of the bearing compartment. Consequently, use is made of a bypass line having a non-return valve for bypassing the bleed pump. The non-return valve opens a wide cross-section for exhausting purposes when the jet pump is activated in the case of quick discharge. In the normal case, the non-return valve is closed by the pressure difference generated by the bleed pump.

BRIEF DESCRIPTION OF THE DRAWING

Further details and advantages of the invention are explained in more detail below with the aid of the drawing.

DETAILED DESCRIPTION OF THE INVENTION

The drawing shows a diagrammatic exemplary embodiment of the invention, applied in the present case to a hydrogen-cooled generator.

The hydrogen-cooled generator is located in a generator housing 1, the generator shaft 2 being guided firstly through a labyrinth seal 5 into a prechamber 3, then through a hydrogen seal 6 into a bearing compartment 4, and from there through a further labyrinth seal 7 into the power house 20.

Given an intact hydrogen seal 6, the pressure in the generator housing 1 and in the prechamber 3 is approximately the same, while a slight underpressure prevails in the bearing compartment 4. This underpressure is generated by a bleed pump 17. It produces a weak air flow from the power house 20 through the labyrinth seal 7 and the bleed line 9 to an outlet 14, preferably above the roof 19 of the power house 20.

Connected to the prechamber 3 is a quick discharge line 8 which can be opened by a valve 10 which is closed in normal operation. A sensor 13, for example in the bearing compartment 4, monitors the hydrogen concentration there and reports the latter via a measuring line 12 to the valve controller 11 which opens the valve 10 upon the occurrence of an excessive hydrogen concentration in the bearing compartment 4. This typically occurs when the hydrogen seal 6 fails. In this case, the hydrogen at overpressure flows from the prechamber 3 through the valve 10 and through the quick discharge line 8 into a jet pump 15 and from there to the hydrogen outlet 14. At the suction line 16 of the jet pump 15, the hydrogen jet generates a substantial underpressure which leads to exhausting the atmosphere in the bearing compartment 4. Since the bleed pump 17 cannot pass such a large volumetric flow, the non-return valve 18 opens in the bypass line bypassing the bleed pump 17. In so doing, it permits quick exhaustion of any hydrogen which has penetrated into the bearing compartment 4, thus ensuring that said hydrogen cannot pass through the labyrinth seal 7 into the power house 20. The entire jet pump 15 is preferably arranged on or above the roof 19 of the power house 20, where escaping hydrogen is typically released to the environment.

The present invention uses simple means, in particular without essential mechanical parts (except for a non-return valve) and without additional supply of energy, also to achieve quick exhaustion from the bearing compartment purely by utilizing the kinetic energy of the hydrogen escaping through the quick discharge line. In the case of quick discharge, the connection between the quick discharge line and the bleed line also effects automatic exhaustion of the second housing part, with the result that hydrogen which has generated there cannot pass into the power house surrounding the housing parts. This exhaustion occurs automatically in the case of any quick discharge without the need for additional control or regulating measures, with the result that the reliability of the overall system with respect to the escape of hydrogen into the power house is substantially increased.

List of reference numerals

1 Generator housing
2 Generator shaft
3 First housing part (prechamber)
4 Second housing part (bearing compartment)
5 Labyrinth seal
6 Hydrogen seal
7 Labyrinth seal
8 Quick discharge line
9 Bleed line
10 Valve
11 Valve controller
12 Measuring line
13 Sensor
14 Hydrogen outlet
15 Jet pump
16 Suction line
17 Bleed pump
18 Non-return valve
19 Power house roof
20 Power house

What is claimed is:

1. A method for quick pressure relief in a system having at least a first housing part and a second housing part, wherein in a normal state the first housing part contains hydrogen at overpressure which is separated from the interior of the second housing part by a hydrogen seal, said method comprising: lowering the pressure of the overpressure hydrogen in the first housing part via a quick discharge line upon failure of the hydrogen seal, and exhausting gas from the interior of the second housing part via a bleed line which is connected to the quick discharge line.

2. A method according to claim 1, wherein said lowering the pressure of the overpressure hydrogen in the first housing part comprises pumping the overpressure hydrogen through a jet pump in the quick discharge line, and wherein said exhausting gas from the interior of the second housing part comprises sucking gas through a suction line of the jet pump wherein the suction line is connected to the bleed line.

3. A method according to claim 1, further comprising, in the case of quick discharge, bypassing a bleed pump arranged in the bleed line by a bypass line having a non-return valve.

4. A method according to claim 1, wherein said lowering the pressure of the overpressure hydrogen in the first housing part and said exhausting gas from the interior of the second housing part comprise discharging into the outside air.

5. A method according to claim 1, wherein said lowering the pressure of the overpressure hydrogen in the first housing part and said exhausting gas from the interior of the second housing part comprise discharging into the outside air above a power house in which said first and second housing parts are located.

6. A quick pressure relief device for a hydrogen-cooled generator system, the system having at least a first housing part, a second housing part, and a hydrogen seal which separates the first housing part from the interior of the second housing part, wherein in a normal state overpressure hydrogen is contained in the first housing part, the quick pressure relief device comprising:

a seal failure detector for detecting a failure of the hydrogen seal of the hydrogen-cooled generator system;

a quick discharge line for relieving pressure from the first housing part of the hydrogen-cooled generator system upon a failure of the hydrogen seal of the hydrogen-cooled generator system; and a bleed line fluidically connected to said quick discharge line and to the interior of the second housing part of the hydrogen-cooled generator system.

7. A device according to claim 6, further comprising a jet pump in the quick discharge line, wherein the jet pump has a suction line which is connected to the bleed line for the interior of the second housing part.

8. A device according to claim 7, further comprising an outlet of the jet pump wherein at least the outlet of the jet pump is arranged above a roof of a power house.

9. A device according to claims 8, wherein the jet pump is arranged entirely above the roof.

10. A device according to claim 8, wherein the jet pump is arranged partly above the roof.

11. A device according to claim 6 further comprising a bleed pump arranged in the bleed line and a bypass line having a non-return valve for bypassing the bleed pump in the case of quick discharge.

12. A device according to claim 6, further comprising: a valve, a valve controller, and at least one sensor, wherein the at least one sensor is arranged in the second housing part, wherein by means of the sensor the presence of hydrogen can be determined and wherein the sensor is connected via a measuring line to the valve controller which controls the valve for opening the quick discharge line.

13. A device according to claim 6, wherein the system is a generator system having a generator shaft extending through the first housing part and the second housing part, the first housing part being the prechamber of a hydrogen-cooled generator, which is generator housing by a labyrinth seal.

14. A device according to claim 13, wherein the second housing part is a bearing compartment whose interior is separated from the prechamber by a hydrogen seal and from the exterior of the system by a labyrinth seal.

* * * * *